L. LARSON.
WAGON JACK.
APPLICATION FILED APR. 21, 1916.
1,211,601.
Patented Jan. 9, 1917.
2 SHEETS—SHEET 2.
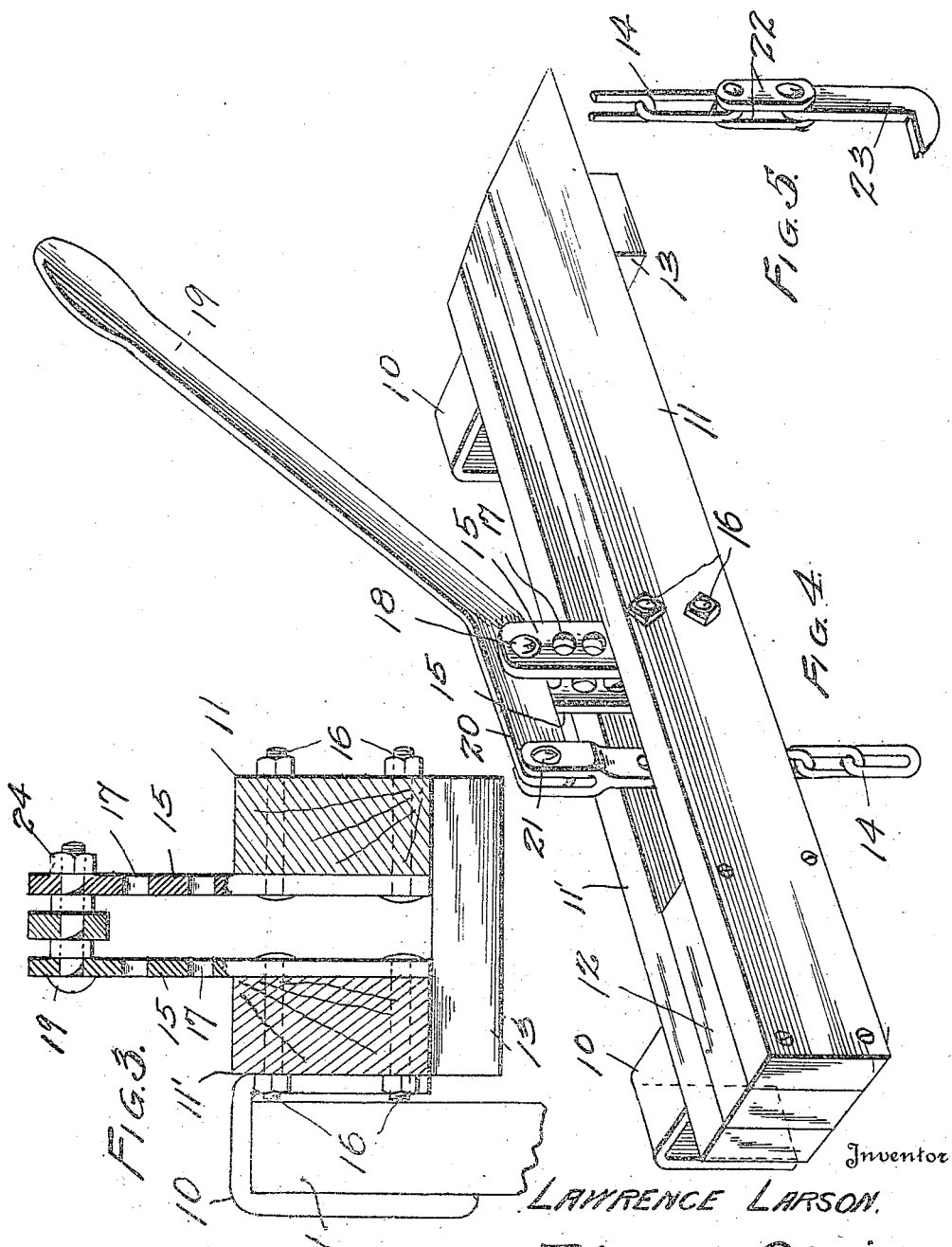
Inventor
LAWRENCE LARSON.
By Homer A. Phillips
Attorney

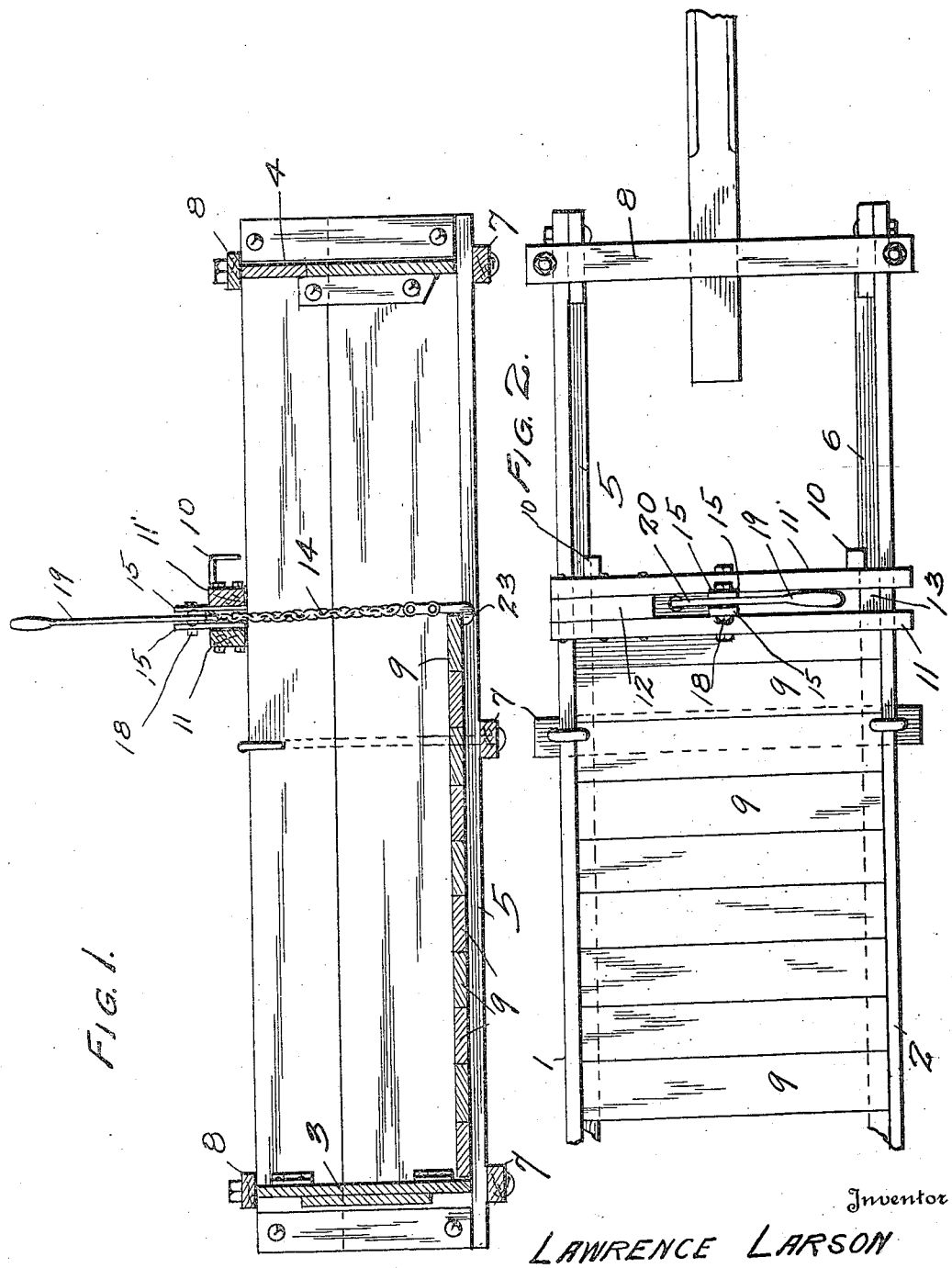

UNITED STATES PATENT OFFICE.

LAWRENCE LARSON, OF MILFORD, IOWA.

WAGON-JACK.

1,211,601. Specification of Letters Patent. Patented Jan. 9, 1917.

Application filed April 21, 1916. Serial No. 92,643.

*To all whom it may concern:*

Be it known that I, LAWRENCE LARSON, a citizen of the United States of America, residing at Milford, in the county of Dickinson and State of Iowa, have invented new and useful Improvements in Wagon-Jacks, of which the following is a specification.

The present invention relates to improvements in wagon jacks, and is designed particularly for use during the operation of dumping a wagon which is provided with removable bottom boards.

The primary object of the invention is the provision of a device which may be manipulated with facility during the operation of dumping a wagon load of sand, gravel, or soil, in which the bottom of the wagon is made up of transversely arranged, removable boards which are independently supported and which may be independently detached from the wagon bottom. While the wagon jack is capable of use in other ways and for other purposes, it is especially adapted to be supported above the sides of a wagon and arranged transversely of the wagon, and the device is movably supported, so that it may be adjusted as desired.

The invention consists in certain novel combinations and arrangements of parts as hereinafter set forth and claimed.

In the accompanying drawings I have illustrated one complete example of the physical embodiment of my invention, constructed according to the best mode I have so far devised for the practical application of the principles of the invention.

Figure 1 shows a wagon body, in longitudinal section, with the wagon jack supported thereon and illustrated in position to remove one of the bottom boards. Fig. 2 is a plan view of a portion of Fig. 1. Fig. 3 is a transverse section of the wagon jack. Fig. 4 is a perspective view of the jack. Fig. 5 is a perspective view of the hook portion of the wagon jack.

In the practical application of my wagon jack, it is used preferably in connection with a dumping wagon which is provided with transversely arranged bottom boards, and to illustrate my invention I have employed a wagon body having the two side members 1 and 2, the rear tail gate 3, and the front dash board 4, and suitable devices are illustrated for supporting the tail gate and front dash board. Beneath the sides are a pair of longitudinal bottom bars 5 and 6, and three cross bars 7, 7, 7, are illustrated beneath the wagon body, and two cross bars 8, 8 are illustrated above the wagon body as supporting members. Suspended between the two longitudinal bottom bars are the removable transversely arranged bottom boards 9, having their ends supported upon the bottom bars 5 and 6, as illustrated in Figs. 1 and 2. It will be readily understood that these bottom boards are to be removed consecutively in the process of dumping the wagon and emptying the contents through the opening in the bottom of the wagon. To accomplish this purpose I provide the wagon jack illustrated herein, which when not in use, may be supported upon the wagon side 1 by means of a pair of hooks as 10—10.

The wagon jack is preferably made up of a pair of parallel spaced bars 11—11' joined at one end by a block 12, and at the other end by a strap 13. These four members are rigidly secured together with a space between through which the chain 14 extends, and in which the supporting brackets 15—15 are located. These brackets are metal plates, each secured by a pair of bolts 16 to the respective bars of the wagon jack, and the brackets project above the top surface of the bars as illustrated. The brackets are perforated as at 17, and in the figures of drawing a pivot bolt 18 is passed through the upper pair of perforations 17, and the lever 19 is pivoted on the bolt and adapted to swing in the vertical plane between the two parallel bars. To the short arm 20 of the lever, the chain 14 is attached at 21. The chain extends down between the two bars 11—11', and may be made up of suitable links, but the lower end of the chain has a pair of special links 22 to which the hook 23 is pivoted and these links 22 may be used to adjust the length of the lifting chain of the lever.

The purpose of the wagon jack is graphically illustrated in Figs. 1 and 2, where it will be seen that the jack is arranged transversely of the wagon body with the strap 13 resting against the inner edge of the side 2 of the wagon body, and the under faces of the bars 11—11' of the jack are resting upon the upper edge of the wagon body. In this manner the strap 13 holds the jack in proper position, and the jack may be slid along on top of the wagon body sides as it is used. The chain 14 depending through the wagon jack is in position for the hook 23 to be engaged under the outer edge of a bottom board, as shown in Fig. 1, and it will be readily understood that when pressure is applied to the lever 19, and the long arm is pressed down, the chain will lift one edge of the bottom board, thus tilting it to dislodge the material resting thereon. The boards may be tilted and permitted to drop through the opening in the bottom of the wagon, or they may be disposed of in other suitable manner. As the process of unloading the wagon progresses, the jack is slid along to the left in Figs. 1 and 2, and each succeeding bottom board is tilted and removed, and the contents of the wagon is displaced and permitted to fall through the open bottom of the wagon.

As before stated, when the jack is not being used, it is hung at the side of the wagon by means of the two hooks 10—10 so that it will be out of the way when not in use, and yet accessible when needed. The altitude of the pivot for the lever 19 may be changed by utilizing the perforations 17 in the supporting bracket plates 15. To adjust the height of the lever the bolt 18 is removed, and the lever lowered and then the bolt is inserted through the alined openings in the bracket plates and the lever and then the nut 24 and then tightened on the bolt 18.

From the above description taken in connection with my drawings it will be apparent that I have provided a comparatively perfect device for performing the functions set forth as the purpose and object of my invention, and the wagon jack has proven by actual test, to be an efficient, durable, simple, and comparatively inexpensive device for this purpose.

What I claim is:

The combination with a wagon body having individually removable transversely arranged bottom boards, of a movable jack adapted to rest upon the top of the wagon body and comprising a pair of spaced bars, a filler block and a guide strap, a pair of brackets supported between the spaced bars, a pivoted lever adjustable in said brackets, and a chain and hook attached to the lever adapted to lift the bottom boards successively.

In testimony whereof I affix my signature.

LAWRENCE LARSON.